Nov. 13, 1934.  R. W. GOFF  1,980,796

MOTOR STARTER AND CONTROL SYSTEM

Filed Nov. 23, 1932  2 Sheets-Sheet 1

Inventor:
Robert W. Goff,
by Charles E. Tuella
His Attorney.

Nov. 13, 1934.   R. W. GOFF   1,980,796
MOTOR STARTER AND CONTROL SYSTEM
Filed Nov. 23, 1932   2 Sheets-Sheet 2

Inventor:
Robert W. Goff,
by Chas. W. Mullen
His Attorney.

Patented Nov. 13, 1934

1,980,796

UNITED STATES PATENT OFFICE 1,980,796

MOTOR STARTER AND CONTROL SYSTEM

Robert W. Goff, Schenectady, N. Y., assignor to General Electric Company, a corporation of New York Application November 23, 1932, Serial No. 644,047

20 Claims. (Cl. 172—288)

My invention relates to control systems for electric motors, more particularly to the provision of a circuit controlling device arranged so that a motor cannot be restarted until after its counter-electromotive force has been reduced to substantially zero, and has for an object the provision of a simple, rugged and reliable device of this character.

Heretofore in heavy duty cyclical operation of motors, it has often happened that the motor circuit has been opened and subsequently closed before the counter-electromotive force has dropped a substantial amount. The opening of the dynamic braking contacts under such conditions is accompanied with heavy arcing at the contacts. In order to protect these contacts from the electrical arc, an arc chute has been provided for these contacts. Furthermore, in case the motor is to be reversed before the counter-electromotive force has dropped a substantial amount, the motor is plugged to a standstill and, as is well understood in the art, the resulting current flow often causes damage by arcing at the contacts of the starter.

A further object of my invention is the prevention of the opening of the dynamic brake contacts except on low values of current, thereby rendering unnecessary the provision of an arc chute for these contacts.

Another object of my invention is to prevent the reversal of the motor when counter-electromotive force exists on said motor.

In carrying out my invention in one form thereof, I provide a magnetically operated motor starter which automatically prevents application of power to the motor as long as there exists counter-electromotive force. More specifically, I provide an interlock operating armature associated with the solenoid of the starter and a coil responsive to the counter-electromotive force of the motor for maintaining the interlock armature in a predetermined position to prevent the reclosing of the starter as long as counter-electromotive force is generated by the motor.

Figure 1:
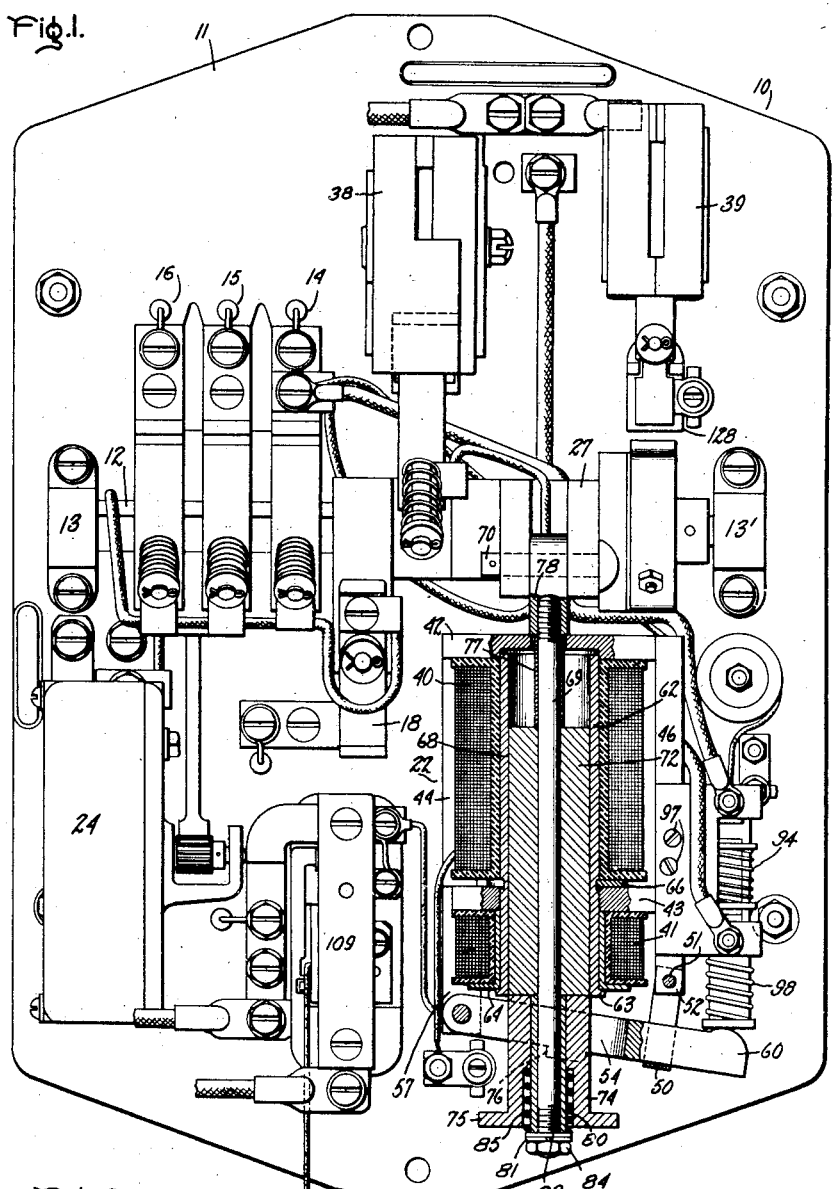
Figure 2:
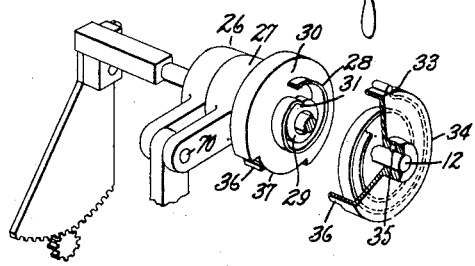
Figure 3:
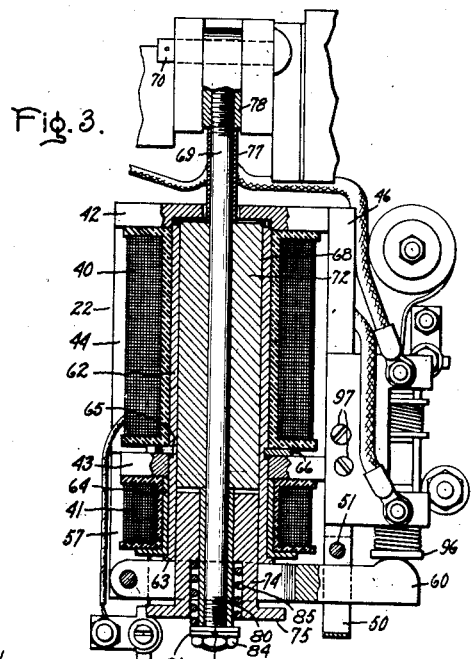
Figure 4:
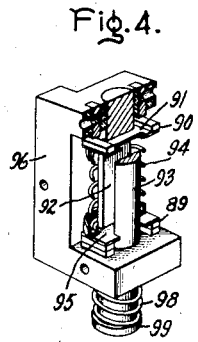
Figure 5:
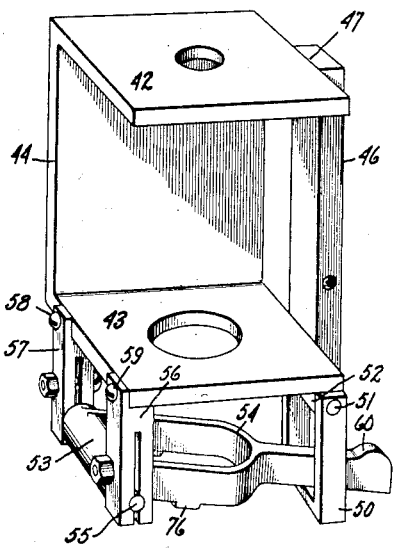
Figure 6:
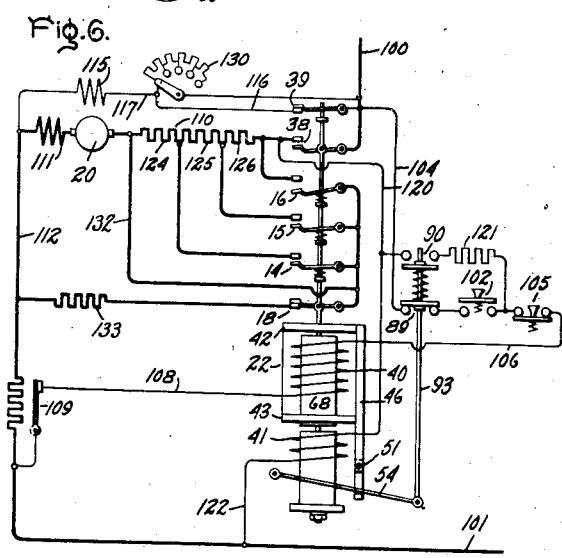

For a more complete understanding of my invention reference should now be had to the accompanying drawings in which Fig. 1 illustrates a front elevation, partly in section, of a magnetic starter embodying my invention; Fig. 2 is an exploded perspective view of a contact and timer operating mechanism; Fig. 3 is a front elevation, partly in section, of the operating solenoid shown in Fig. 1; Fig. 4 is a perspective view, partly in section, of the interlock contacts; Fig. 5 is a perspective view of the magnetic circuit of the device of Fig. 1, while Fig. 6 illustrates diagrammatically the magnetic starter of Fig. 1 embodied in a motor control circuit.

It is believed that a clear understanding of the arrangement and operation of the various parts of the starter and system will best be understood from a complete description of the operation of the starter as it functions in the system and therefore the construction and arrangement of certain devices only will be first described in detail.

Referring now to the drawings, I have shown my invention in one form as applied to a magnetic starter 10 assembled upon a panel 11. A shaft 12 rotatably mounted by the bearings 13 and 13′ is arranged to close the accelerating contacts 14, 15 and 16 in succession. The normally closed contacts 18 are arranged to be opened by the shaft 12, the contacts 18 normally completing the dynamic braking circuit for a motor 20 (Fig. 6). The connection between the solenoid 22, the accelerating contacts 14 to 16, inclusive, and a timing device 24 is provided by an operating mechanism 26 (Fig. 2). This mechanism forms no part of the present invention. It is fully described and broadly claimed in my copending application Serial No. 644,049 filed November 23, 1932, and assigned to the same assignee as the present invention. In the present application the mechanism will be described by saying that a member 27 is supported by the shaft 12 but is arranged to be rotated independently thereof. The only connection between the member 27 and the shaft 12 is provided by a coil spring 28. As shown in Fig. 2, the inner end of the spring is connected by means of a slot 31 to a hub portion 29 of a flange 30 provided on the member 27. The outer end of the spring extends through a slot 33 provided in an enclosing casing 34, the hub of which is secured to the shaft 12 by a pin 35. The coil spring 28 is normally maintained under tension so that a predetermined tension of the spring can be applied to the shaft 12 to close the contacts 14 to 16, inclusive. The normal tension of the spring is obtained when the switch is assembled. For example, the inner end of the spring is placed in the slot 31 and the outer end of the spring is placed in the slot 33. The enclosing casing 34 is then rotated in a counterclockwise direction until an extension 36 formed integrally with the casing 34 coincides with an arcuate slot 37 formed in the flange 30. It will now be observed that the normal tension of the spring is applied to the shaft 26 whenever the solenoid 22 rotates the member 27 in a clockwise direction.

The timing device 24 may be of any suitable type of which there are many known to the art. The line contacts 38 are arranged to be operated directly by the solenoid 22 while the opening of the normally closed field contacts 39 is delayed by the device 24.

The solenoid 22 includes an operating coil 40 and a holding counter-electromotive force coil 41. The solenoid operating coil 40 is mounted between the ends 42 and 43 of a U-shaped magnetic frame 44. A magnetic member 46 is secured to and extends from the central portion 47 of the frame 44 downwardly below the end 43. A holding bar 50 of magnetic material formed in the shape of a yoke is pivotally connected by a threaded bolt 51 to the lower end 52 of the member 46. The bolt 51 is made of magnetic material so that the yoke 50 is directly secured to the member 46 without the intervention of an air gap. An interlock operating armature 54 formed of magnetic material is pivotally mounted by a pin 55 from a pair of brass brackets 56 and 57. These brackets are secured by the screws 58 and 59 to the lower end 43 of the magnet 44. The armature 54 is Y-shaped with its single end 60 extending through and beyond the holding bar 50.

As shown in Figs. 1 and 3, the holding coil 41 of the solenoid is mounted below the lower end 43 of the magnetic frame. The coil is secured in position by means of a brass bushing 62 provided with a flange 63 at its lower end so as to be in engagement with a bushing 64 formed of magnetic material. A circular slot 65 is provided in the bushing 62 so that a locking ring 66 cooperates with the slot 65 to wedge the coil 40 against the end 42 of the frame 44 and also to wedge the flange 63 against the bushing 64 so as to hold the coil 41 against the end 43. The bushing 64 of magnetic material is made of sufficient length so as to be in abutting engagement with the lower end 43 of the magnetic frame 44.

The solenoid plunger 68 is connected to the operating mechanism 26 by means of a brass rod 69 which is pivotally connected to the member 27 by a pin 70. The plunger 68 includes a cylindrical member 72 of magnetic material. The length of the member 72 is slightly greater than the distance between the upper ends 42 and 43 of the magnetic frame 44. Below the cylindrical member 72 there is also mounted in concentric relation with the brass rod 69 a brass bushing 74. This brass bushing has an outwardly extending flange 75 which is arranged to engage projections 76 (Fig. 5) provided on the interlock operating armature 54. The magnetic member 72 is rigidly held in a predetermined position by means of a brass cylinder 77 normally in abutting engagement with one end 78 of the member 27 and a second brass cylinder 80 having its respective ends in abutting engagement with the magnetic member 72 and a washer 81. It will be observed that the lower end of the brass rod 69 is provided with screw threads 82 so that by tightening the nut 84 the washer 81 in cooperation with the cylinders 77 and 80 fixedly secures the magnetic member 72 in position. The bushing 74, however, is resiliently carried by the brass rod 69 by reason of a compression spring 85 which surrounds the cylinder 80. The compression spring 85 under slightly normal compression bears against the washer 81 so that the bushing 74 is normally urged upwardly against the magnetic member 72. The compression spring 85 besides providing a lost motion connection for the armature 54 plays an important function in increasing the life of this member of the starter. The compression spring normally exerts a turning effort on the brass bushing 74, which effort is sufficient to rotate the bushing 74 a slight amount each time the starter is operated. The rotation of the bushing 74 produces a uniform wear of the outwardly extending flange 75.

Referring now to Figs. 3 and 4, it will be observed that the normally closed interlock contacts 89 and the normally open interlock contacts 90 are arranged to be operated by the interlock operating armature 54. It will further be observed that as the interlock operating armature 54 moves upwardly the contacts 90 are first closed and then the contacts 89 are opened. This sequence of operation is obtained by mounting the bridging member 91 of the contacts 90 in a slot 92 provided in a rod 93. The lower end of the rod 93 is arranged to be engaged by the armature 54. A coil spring 94 encircling the rod 93 supports the bridging member 91 of the contacts 90 in the slot 92. The coil spring 94, normally under compression and in engagement with the bridging member 95 of the contacts 89 maintains these contacts closed. The rod 93 and the contacts are mounted in a U-shaped support 96, which support is secured to the magnetic member 44 by the screws 97. Below the lower end of the support 96 and encircling the rod 93 is a coil spring 98 normally under a tension of greater magnitude than the tension of the spring 94. A flange 99 formed on the rod 93 secures the spring 94 in position. The slot 92 extends below the lower end of the support 96 so that the spring 94 is effective in maintaining these contacts closed until after the contacts 90 have been closed.

With the above understanding of the elements and their organization with respect to each other in the system, the operation of the system itself and the manner in which the starter functions to prevent the energization of the motor so long as it is generating counter-electromotive force will be readily understood from the description which follows.

In the operation of my invention it will be assumed that the supply lines 100 and 101 (Fig. 6) representing a suitable source of supply are energized, and that a normally open start button 102 has been depressed. An energizing circuit is thereby completed for the starter operating coil 40. This circuit may be traced from the supply line 100, by conductor 104, interlock contacts 89, start push button 102, a normally closed stop push button 105, conductor 106, operating coil 22, conductor 108, thermal overload relay 109, and to the other supply line 101. The solenoid plunger 68 is immediately operated to the position shown in Fig. 3. During the initial part of the movement of the solenoid the line contacts 38 are closed while the normally closed dynamic braking contacts 18 are opened. The closing of the line contacts establishes an energizing circuit for the motor 20 which circuit may be traced from the supply line 100, line contacts 38, accelerating resistor 110, armature of the motor 20, series field winding 111, conductor 112, thermal overload relay 109 and to the other supply line 101. The motor 20 is provided with a field winding 115 which is normally connected directly across the line by means of the normally closed field contacts 39. This circuit may be traced from the supply line 100, normally closed field contacts 39, conductors 116 and 117, field winding 115, conductor 112, overload relay 109 and to the other supply line 101.

Immediately after the closing of the line contacts 38, the energization of the operating coil 40 is reduced by the operation of the interlock contacts 89 and 90. It will be remembered that these contacts are operated by the movement of the armature 54. Until the flange 75 of the bushing 74 engages the projections 76 on the armature, the armature is magnetically held against the holding bar 50 thereby preventing the immediate operation of the interlock contacts. The magnetic circuit which includes the bar 50 extends from the lower end 52 of the member 46, the holding bar 50 held in contact with the member 46 by the bolt 51, armature 54 and through an air gap to the magnetic bushing 64 which abuts against the lower end 43 of the frame 44. Due to the physical contact between the bar 50 and the armature 54, the magnetic attractive effort between them is greater than the attractive effort between the armature 54 and the bushing 64.

If the holding bar 50 were not provided the armature 54 might be operated due to the magnetic attractive effort produced by the coil 40. The result would be the premature transfer of the coil from the operating circuit to the holding circuit and the stator would not operate to complete the acceleration of the motor.

The coil spring 85 also acts to increase the degree of movement of the plunger 68 before the bushing 74 engages the armature 54. Since the plunger 68 moves at high speed from one to the other of its positions, the inertia of the bushing 74 is sufficient to compress the spring 85 so that the armature 54 is engaged at a later time than if the spring were not provided.

As soon as the flange 75 of the bushing 74 engages the armature projections 76, the armature causes the rod 93 to be moved upwardly. The upward movement of the slot 92 of the rod 93 clears the path for the bridging member 90 so that the spring operates the bridging member to close the contacts 90. As soon as the line contacts 38 are closed a holding circuit for the operating coil 40 is established. This circuit may be traced from the supply line 100, line contacts 38, conductor 120, interlock contacts 90, holding resistor 121, normally closed stop push button 105, conductor 106, operating coil 40, conductor 108, thermal overload relay 109 and to the other supply line 101. At the same time there is established an energizing circuit for the holding and counter-electromotive force coil 41. This circuit may be traced from the supply line 100, line contacts 38, conductor 120, holding coil 41, and by conductor 122 to the other supply line 101.

As the solenoid plunger 68 reaches the limit of its movement, the lower end of the slot 92 of the rod 93 engages the bridging member 95 to open the interlock contacts 89. The plunger 68, however, is maintained in its operated position by the energization of the coil 40 through the holding circuit and by the energization of the coil 41.

It should here be observed that the armature 54 comes to rest with its end 60 engaging the lower end 52 of the magnetic member 46. Consequently there is a substantial magnetic effort exerted on the armature to hold it against the member 46.

Referring now to Fig. 2, it will be seen that the operation of the solenoid plunger 68 from the position shown in Fig. 1 to the position shown in Fig. 3, rotates the flange 30 in a clockwise direction so as to free the path for the projection 36 provided on the enclosing casing 34. Consequently, the tension of the coil spring 28 is applied to the shaft 12 to cause rotation of the shaft in a clockwise direction. As I have already explained, the timing device 24 delays the movement of the operating shaft 12 and the movement of the enclosing casing 34. After a short interval of time the contacts 14 are closed to short circuit section 124 of the resistor 110, and after the expiration of additional intervals of time the contacts 15 and 16 are successively closed to short circuit the resistor sections 125 and 126. A short interval of time after the accelerating contacts 16 are closed the field contacts 39 are arranged to be opened by a member 128 secured to the enclosing casing 34. The opening of these contacts connects the motor field winding 115 across the supply lines through a speed controlling rheostat 130.

If it is desired at any time to deenergize the motor 20, the stop push button 105 is momentarily opened to deenergize the solenoid operating coil 40. Consequent to the opening of this circuit the solenoid 68 operates to open the accelerating contacts 14, 15 and 16 and the line contacts 38 while the field contacts 39 are closed to exclude the resistor 130 from the field circuit. At the same time the dynamic braking contacts 18 are closed to establish a braking circuit for the motor. This circuit may be traced from one side of the armature of motor 20 by conductor 132, contacts 18, braking resistor 133, conductor 112 and through the series field winding 111 to the other side of the motor armature.

The starter contacts cannot be immediately reclosed, however, because the interlock contacts 89 are held in open position by the interlock operating armature 54 to prevent the completion of the operating circuit to the coil 40. The interlock operating armature is magnetically held in its upper position (Fig. 3) after the plunger 68 drops out, by reason of the constant flow of current through the counter-electromotive force coil 41. The end of this coil connected to the motor side of the line contacts 38 is always at a higher potential than the end of the coil which is connected to the other side of the motor armature. It will, therefore, be seen that current continues to flow through the coil 41 after the line contacts 38 have been operated to the open position. The residual magnetism also acts to maintain the armature 54 against the lower end 52 of member 46. Although the magnetic attraction on the armature 54 is primarily due to the counter-electromotive force coil 41, it will be seen that the coil 40 assists this coil. As soon as the stop button 105 is released a circuit is completed through its contacts for the coil 40. This circuit may be traced from the motor side of the line contacts 38 by conductor 120, interlock contacts 90, holding resistor 121, stop push button 105, conductor 106, operating coil 40, conductor 108, thermal overload relay 109, conductor 112 and through the series field 111 to the other side of the armature of the motor. The operating coil 40 is therefore responsive to the counter-electromotive force of the motor and the magnetic energy acts on the armature 54.

Due to the dynamic braking of the motor its speed and generated voltage are quickly decreased and the energization of the coils 40 and 41 is correspondingly decreased. The relation between the counter-electromotive force and the release of the armature 54 is determined by the air gap between the magnetic bushing 64 and the armature. By decreasing the gap the armature will be held in position for lower values of voltage and by increasing the air gap the armature will be released for higher values of generative voltage. In one embodiment of my invention an air gap was selected so that the interlock operating armature 54 was released when the generated or counter-electromotive force of the motor had been reduced substantially 95%.

It will now be assumed that the voltage has been reduced sufficiently for the armature 54 to be released. The spring 98 thereupon returns the rod 93 to its original position to open the contacts and to close the contacts 89 and the interlock operating armature 54 comes to rest against the holding bar 50.

By connecting the operating coil 40 to the motor side of the line contacts 38 it will be seen that the holding circuit during motoring depends upon the line contacts 38 being closed. If the holding circuit were established directly across the source of supply the coil 40 might produce sufficient magnetism to prevent the release of the interlock operating armature 54. As shown, during braking the energization of both coils is decreased as the counter-electromotive force decreases.

In case dynamic braking is not provided for, it will be seen that the interlock contacts 89 will be held in the open position to prevent the completion of the operating circuit for the coil 40 until after the counter-electromotive force of the motor has been reduced a predetermined amount. The only difference in operation will be that it takes a somewhat longer time before the start push button 102 is again effective to operate the starter.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is,—

1. In an electromagnetic device, a member mounted for movement from one position to another, an operating coil for biasing said member in one or the other of said positions and a second member operated by said coil for moving said first member from one of said positions to the other.

2. In an electromagnetic device, a member mounted for movement from one position to another, an operating coil for operating said member, a second member, means mounting said second member adjacent said coil for movement between predetermined positions, and a magnetic frame associated with said coil and formed so as to hold magnetically said second member in either of said predetermined positions.

3. In an electroresponsive device, the combination of a pair of movable members, an operating coil, means for controlling the energization of said coil, a magnetic frame arranged to be magnetized by said coil and having parallel flux paths, means supporting one member in operative relation to one flux path for movement from one position to a second position by the attractive effort produced by said coil, and means supporting the second member in juxtaposition to the other flux path for movement between predetermined positions, the said frame being formed so that the flux of said other flux path biases said second member to each of its predetermined positions, and means on said first member for operating said second member from one to the other of said positions.

4. In an electroresponsive device, the combination of a pair of movable members, an operating coil for producing attractive efforts on said members, means for controlling the energization of said coil, a magnetic frame arranged to be magnetized by said coil and having parallel flux paths, means supporting one member for movement from one position to a second position by the attractive effort produced by said coil, a yoke of magnetic material secured to said frame at an end portion thereof, means supporting said second member within said yoke and movable between opposite faces of said yoke, the flux between said yoke and said member biasing said member to each of said faces, and means operable with said first member for operating said second member from one of said faces to the other of said faces.

5. In an electroresponsive device, the combination of a magnetic frame, a member movable between predetermined positions associated with said frame, a coil for magnetizing said frame and for operating said member, magnetic members arranged to form extensions on said frame, a second member, means mounting said second member in spaced relation with one of said extensions and for movement from one position to a second position on said other extension, said other extension being formed so that said second member engages said extension only at said predetermined positions, means on said first member for operating said second member from one to the second of its positions, an auxiliary coil operatively associated with one of said extensions, and means for controlling the energization of said coil to hold said second member in said second position irrespective of the energization of said first coil or the position of said first member.

6. In an electromagnetic device, the combination of a solenoid operable between predetermined positions and provided with an operating coil, means for controlling the energization of said coil, a magnetic frame associated with said coil and said solenoid, a second coil arranged in co-axial relation with said first coil, an armature, means pivotally mounting said armature for movement to and from the lower portion of said auxiliary coil, a magnetic member extending from said frame through the mid-portion of said coil to said lower portion of said coil, a second extension secured to said frame in spaced relation with said auxiliary coil, said second extension being formed in the shape of a yoke so as to limit the movement of the armature between opposite faces of said yoke, and means for operating said armature from one to the other of said faces whenever said solenoid is operated from a given position to another position.

7. In an electromagnetic device, the combination of a solenoid movable from one position to a second position and provided with an operating coil, an armature movable from one position to another position, means for preventing movement of said armature until said solenoid has been operated from said one position to substantially said second position, comprising magnetic means responsive to the energization of said coil for biasing said armature in one or the other of its positions, an operating member arranged to engage said armature, a coil spring for supporting said member in co-axial relation with said solenoid, so that said spring is initially compressed by the inertia of said operating member when the solenoid is operated from one to the other of its positions thereby introducing a time delay in the operation of said armature.

8. In an electromagnetic device, the combination of a solenoid provided with an operating coil, an auxiliary armature, means mounting said armature for movement from one position to a second position, normally open and normally closed interlock contacts, bridging members for said contacts, a rod provided with a slot, a normally compressed coil spring encircling said rod for biasing said bridging members towards said contacts, and means for supporting said interlock contacts with respect to said slot so that said normally open contacts are closed before said normally closed contacts are opened.

9. In an electromagnetic device, the combination of a magnetic frame having two ends at right angles to a common side, said ends being formed with apertures, a solenoid plunger movable from one position to a second position, means mounting said plunger in concentric relation with said apertures, an operating coil arranged in concentric relation with said apertures for operating said plunger, a Y-shaped interlock operating armature, non-magnetic supports secured to one end of the frame for supporting said armature for pivotal movement between predetermined positions, means for magnetically biasing said armature to each of said predetermined positions comprising a magnetic member extending from one side of the upper end of said frame to a point below the lower end of said frame, and a U-shaped magnetic yoke secured to said member so that an attractive effort is produced on the single end of said Y-shaped armature when it is engaging said U-shaped member or said magnetic member.

10. In combination, a motor provided with a field winding, a starter comprising a plurality of contacts for controlling the energization of said motor, an operating coil, an operating circuit for energizing said coil to close said contacts, means responsive to the closing of one of said contacts for reducing the energization of said coil, and means for preventing the completion of said operating circuit after said contacts have closed until after the counter-electromotive force of said motor has been reduced a substantial amount.

11. In combination, a motor provided with a field winding and an armature, a source of supply for said armature and field winding, a starter comprising a plurality of contacts for controlling the energization of said motor, an operating coil, an operating circuit for energizing said coil to operate said contacts, means responsive to the closing of a pair of said contacts for reducing the energization of said coil, a circuit interrupter connected in circuit with said coil for deenergizing said coil, dynamic brake contacts arranged to be closed as said coil is deenergized to complete a dynamic braking circuit for said motor, and means responsive to the counter-electromotive force of said motor for preventing the opening of said dynamic brake contacts until the counter-electromotive force of said motor drops a predetermined amount.

12. In combination, a motor provided with a field winding, a magnetically operated starter movable between predetermined positions for controlling the energization of said motor, an operating coil for said starter, an operating circuit and a holding circuit for said coil, means for completing said operating circuit to operate said starter from one to the other of said positions, interlock contacts operable with said starter for connecting said coil in said holding circuit, means for interrupting said holding circuit, and means responsive to the counter-electromotive force of said motor for preventing the completion of said operating circuit until after the counter-electromotive force has been reduced a predetermined amount.

13. In combination, a motor provided with a field winding, a magnetically operable circuit controller movable between predetermined positions for controlling the energization of said motor, an operating coil for said controller, means for energizing said coil to operate said controller from one to the other of said positions, interlocking means arranged to be operated with said controller to a predetermined position for reducing the energization of said coil below that required for operating said controller, and means responsive to the electromotive force of said motor for maintaining said interlocking means in said predetermined position after deenergization of said motor to prevent the operation of said controller as long as counterelectromotive force exists on said motor.

14. In combination, a motor provided with a field winding, a circuit controller movable between predetermined positions for controlling the energization of said motor, an operating coil for said controller, an operating circuit and a holding circuit for said coil, a pair of interlock contacts respectively connected in said circuits and operable from one position to a second position to change the connections of said coil from said operating circuit to said holding circuit, a holding coil for maintaining said interlock contacts in said second position, and connections for connecting said holding coil across the armature of said motor so as to be energized in response to the voltage across said motor armature.

15. A motor starter comprising a plurality of circuit controlling contacts, a solenoid having a plunger and an operating coil for operating said plunger from one position to another to close said contacts, normally closed interlock contacts connected in circuit with said operating coil for completing an operating circuit for said coil, an interlock operating armature associated with said plunger for operating said interlock contacts to an open position when said plunger moves from said one to the other of its positions, and a counterelectromotive force coil for maintaining said contacts in said open position after said plunger returns to said one of its positions.

16. In combination, a motor provided with a field winding, a magnetically operated starter for controlling the energization of said motor, an operating coil for said starter, an operating circuit for said coil including normally closed interlock contacts, normally open interlock contacts, a holding resistor, a holding circuit for said operating coil, extending from the motor side of said line contacts and including said normally open interlock contacts and said holding resistor, an interlock operating armature for operating said interlock contacts to transfer said operating coil from said operating circuit to said holding circuit, and means for magnetically holding said armature in said operated position.

17. In combination a motor provided with a field winding and an armature, a source of supply for said armature and said field winding, an accelerating resistor for said motor connected in series with said motor armature, a source of supply for said motor, a magnetically operated circuit controller, normally open line contacts on said controller for connecting said motor armature and resistor to said source of supply, a plurality of accelerating contacts on said controller arranged to be successively closed to short circuit sections of said resistor, a dynamic braking resistor, normally closed dynamic braking contacts for connecting said braking resistor in series with said motor armature, an operating coil for operating the contacts of said controller, normally closed interlock contacts for completing an energizing circuit for said coil, normally open interlock contacts, a holding resistor, connections for connecting said normally open interlock contacts from the motor side of said line contacts in series circuit with said holding resistor and said operating coil to form a holding circuit for said coil, an interlock operating armature arranged to be operated as said line contacts are closed to close said normally open contacts and thereafter to open said normally closed contacts, a counter-electromotive force coil associated with said armature for maintaining said normally closed contacts in an open position, connections for connecting said counter-electromotive force coil in parallel with said motor armature, and means for momentarily interrupting said holding circuit to return said circuit controller contacts to their normal positions whereby said motor armature is disconnected from said source of supply and said dynamic braking circuit is completed by said normally closed dynamic braking contacts, said operating coil and said counter-electromotive force coil thereafter being energized by the counter-electromotive force of said motor.

18. An electromagnetic control device for an electric motor, comprising circuit controlling contacts, an armature operable between predetermined positions for operating said contacts, an operating coil for said armature, normally closed interlock contacts for energizing said coil, normally open interlock contacts for reducing the energization of said coil, an interlock operating armature arranged to be operated between predetermined positions by said coil for operating said interlock contacts, a magnetic frame provided with parallel flux paths for said armatures and said coil, means supporting said armature in operative relation to one flux path for movement from one of said positions to the other position by the attractive effort produced by said coil, and means supporting said interlock armature in juxtaposition to the other flux path for movement between said positions, said frame being formed so that the flux of said other flux path biases said interlock armature to each of its predetermined positions, and means on said armature for operating said interlock armature from one to the other of said positions to open said normally closed contacts and to close said normally open contacts whereby the energization of said operating coil is reduced after said armature has moved from one to the other of its positions.

19. In combination, an electric motor provided with a field winding, an electromagnetic device for controlling the acceleration of said motor, comprising a solenoid operable between predetermined positions and provided with an operating coil, means for controlling the energization of said coil, a magnetic frame associated with said solenoid, a second coil arranged in coaxial relation with said first coil, an interlock operating armature, means pivotally mounting said armature for movement to and from said auxiliary coil, a magnetic member extending from said frame through the mid-portion of said auxiliary coil to the lower portion of said coil, a second extension secured to said frame in spaced relation with said auxiliary coil, said second extension being formed in the shape of a yoke so as to limit the movement of the armature between opposite faces of said yoke, means for operating said armature from one to the other of said faces whenever said solenoid is operated from a given position to another position, contacts operated by said solenoid for reducing the energization of said coil, circuit controlling means operable by said solenoid for controlling the acceleration of said motor, and means for energizing said auxiliary coil in response to the counter-electromotive force of said motor for preventing the operation of said armature until said counter-electromotive force is reduced a predetermined amount.

20. In combination, an electric motor provided with a shunt excited field winding, a control device therefor comprising a plurality of contacts for controlling the energization of said motor, a solenoid provided with an operating coil for operating said contacts, an operating circuit for energizing said coil, an armature mounted for movement between predetermined positions for reducing the energization of said coil, means on said solenoid for operating said armature when said solenoid is operated from one to the other of its positions, and means responsive to the counter-electromotive force of said motor for preventing the return of said armature to its first position until after the counter-electromotive force of said motor drops a predetermined amount.

ROBERT W. GOFF.